(12) United States Patent
Lee et al.

(10) Patent No.: US 7,883,598 B2
(45) Date of Patent: Feb. 8, 2011

(54) APPARATUS AND METHOD FOR MANUFACTURING LIQUID CRYSTAL DISPLAY DEVICES, METHOD FOR USING THE APPARATUS, AND DEVICE PRODUCED BY THE METHOD

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 599 days.

(21) Appl. No.: 11/228,337

(22) Filed: Sep. 19, 2005

(65) Prior Publication Data
US 2006/0005921 A1  Jan. 12, 2006

Related U.S. Application Data

(62) Division of application No. 10/128,561, filed on Apr. 23, 2002, now Pat. No. 6,953,073.

(30) Foreign Application Priority Data

Feb. 20, 2002 (KR) .............................. 10-2002-8899

(51) Int. Cl.
*B29C 65/00* (2006.01)
(52) U.S. Cl. ........................ 156/285; 445/24; 445/25; 347/187; 347/190; 347/191; 347/192
(58) Field of Classification Search ................ 156/285, 156/381, 382, 556; 349/187; 445/24, 25; 347/190–192
See application file for complete search history.

(56) References Cited

U.S. PATENT DOCUMENTS

| 3,978,580 A | 9/1976 | Leupp et al. |
| 4,094,058 A | 6/1978 | Yasutake et al. .......... 29/592 R |
| 4,653,864 A | 3/1987 | Baron et al. |
| 4,691,995 A | 9/1987 | Yamazaki et al. ....... 350/331 R |
| 4,775,225 A | 10/1988 | Tsuboyama et al. |
| 5,247,377 A | 9/1993 | Omeis et al. .................. 359/76 |
| 5,263,888 A | 11/1993 | Ishihara et al. |
| 5,379,139 A | 1/1995 | Sato et al. |
| 5,406,989 A | 4/1995 | Abe |
| 5,407,519 A * | 4/1995 | Joffe et al. .................. 156/358 |

(Continued)

FOREIGN PATENT DOCUMENTS

EP  1 003 066 A1  5/2000

(Continued)

OTHER PUBLICATIONS

Computer translation of JP 09-127528.

*Primary Examiner*—Richard Crispino
*Assistant Examiner*—Christopher Schatz
(74) *Attorney, Agent, or Firm*—McKenna Long & Aldridge LLP

(57) ABSTRACT

An apparatus for vacuum bonding a liquid crystal display device includes a unitary vacuum processing chamber, upper and lower stages provided at upper and lower spaces within the vacuum processing chamber for receiving first and second substrates, and at least one first substrate receiving system provided within the vacuum chamber to contact dummy areas between cell areas of one of the first and second substrates.

4 Claims, 13 Drawing Sheets

U.S. PATENT DOCUMENTS

| | | | | |
|---|---|---|---|---|
| 5,499,128 | A | 3/1996 | Hasegawa et al. | |
| 5,507,323 | A | 4/1996 | Abe | |
| 5,511,591 | A | 4/1996 | Abe | 141/7 |
| 5,539,545 | A | 7/1996 | Shimizu et al. | |
| 5,548,429 | A | 8/1996 | Tsujita | |
| 5,568,297 | A * | 10/1996 | Tsubota et al. | 156/145 |
| 5,642,214 | A | 6/1997 | Ishii et al. | 349/96 |
| 5,680,189 | A | 10/1997 | Shimizu et al. | |
| 5,742,370 | A | 4/1998 | Kim et al. | 349/124 |
| 5,757,451 | A | 5/1998 | Miyazaki et al. | |
| 5,852,484 | A | 12/1998 | Inoue et al. | |
| 5,854,664 | A | 12/1998 | Inoue et al. | |
| 5,861,932 | A | 1/1999 | Inata et al. | |
| 5,875,922 | A | 3/1999 | Chastine et al. | 222/1 |
| 5,952,676 | A | 9/1999 | Sato et al. | |
| 5,956,112 | A | 9/1999 | Fujimori et al. | |
| 6,001,203 | A | 12/1999 | Yamada et al. | |
| 6,011,609 | A | 1/2000 | Kato et al. | 349/190 |
| 6,016,178 | A | 1/2000 | Kataoka et al. | 349/117 |
| 6,016,181 | A | 1/2000 | Shimada | |
| 6,055,035 | A | 4/2000 | Von Gutfeld et al. | 349/187 |
| 6,163,357 | A | 12/2000 | Nakamura | 349/155 |
| 6,219,126 | B1 | 4/2001 | Von Gutfeld | |
| 6,226,067 | B1 | 5/2001 | Nishiguchi et al. | 349/155 |
| 6,236,445 | B1 | 5/2001 | Foschaar et al. | |
| 6,304,306 | B1 | 10/2001 | Shiomi et al. | 349/88 |
| 6,304,311 | B1 | 10/2001 | Egami et al. | 349/189 |
| 6,337,730 | B1 | 1/2002 | Ozaki et al. | |
| 6,414,733 | B1 | 7/2002 | Ishikawa et al. | 349/110 |
| 6,991,699 | B2 * | 1/2006 | Lee et al. | 156/285 |
| 7,341,641 | B2 * | 3/2008 | Lee et al. | 156/273.1 |
| 2001/0021000 | A1 | 9/2001 | Egami | 349/187 |
| 2002/0008838 | A1 | 1/2002 | Matsuda | |
| 2002/0062787 | A1 * | 5/2002 | Hashizume et al. | 118/664 |
| 2003/0171057 | A1 | 9/2003 | Lee et al. | 445/24 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 | 5/2000 |
| JP | 2000-147528 A | 5/2000 |
| JP | 2000-193988 | 7/2000 |
| JP | 2000-241824 A | 9/2000 |
| JP | 2000-284295 | 10/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-005405 | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |

| | | |
|---|---|---|
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 13356353 * | 12/2001 |
| JP | 2002-14360 | 1/2002 |
| JP | 2002-23176 | 1/2002 |
| JP | 2002-040398 | 2/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

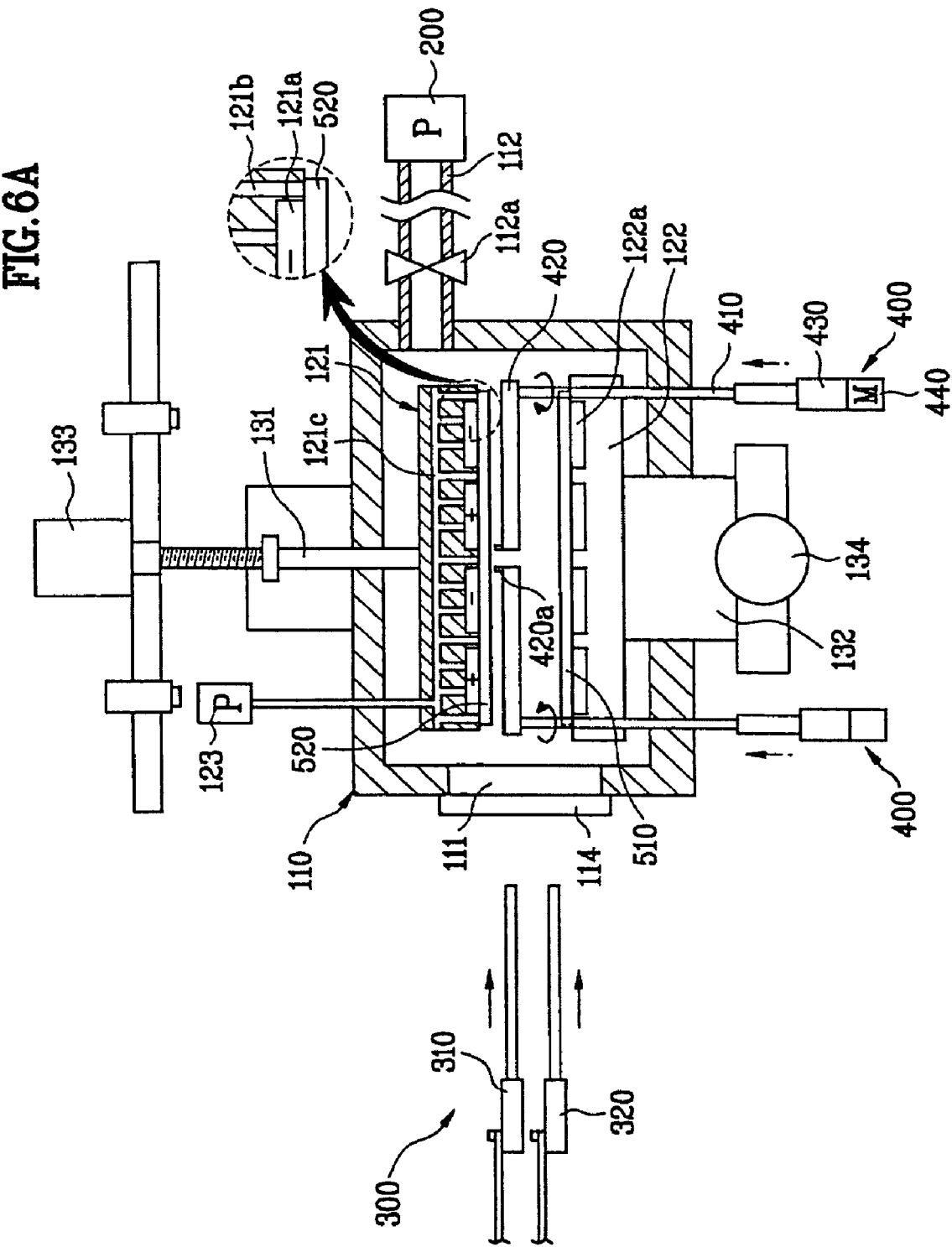

APPARATUS AND METHOD FOR MANUFACTURING LIQUID CRYSTAL DISPLAY DEVICES, METHOD FOR USING THE APPARATUS, AND DEVICE PRODUCED BY THE METHOD

This application is a divisional of prior application Ser. No. 10/128,561, filed Apr. 23, 2002 now U.S. Pat. No. 6,953,073.

The present invention claims the benefit of Korean Patent Application No. P2002-8899 filed in Korea on Feb. 20, 2002, which is hereby incorporated by reference.

BACKGROUND OF THE INVENTION

1. Field of the Invention

The present invention relates to a manufacturing apparatus, and more particularly, to an apparatus for manufacturing a liquid crystal display suitable for a large-sized liquid crystal display.

2. Discussion of the Related Art

In general, recent developments in the information communication field have increased demand for various types of displays devices. In response to this demand, various flat panel type displays such as liquid crystal display (LCD), plasma display panel (PDP), electro-luminescent display (ELD), and vacuum fluorescent display (VFD) have been developed to replace conventional cathode ray tube (CRT) devices. In particular, LCD devices have been used because of their high resolution, light weight, thin profile, and low power consumption. In addition, LCD devices have been implemented in mobile devices such as monitors for notebook computers. Furthermore, LCD devices have been developed for monitors of computer and television to receive and display broadcasting signals.

Accordingly, efforts to improve image quality of LCD devices will contrast with the benefits of high resolution, light weight, thin profile, and low power consumption. In order to incorporate LCD devices as a general image display, image quality such as fineness, brightness, large-sized area, for example, must be realized.

A plurality of gate lines are formed along one direction at fixed intervals on the first glass substrate (TFT array substrate), and a plurality of data lines are formed along a second direction perpendicular to one direction of the plurality of gate lines, thereby defining a plurality of pixel regions. Then, a plurality of pixel electrodes are formed in a matrix arrangement at the pixel regions, and a plurality of thin film transistors (TFT) are formed at the pixel regions. Accordingly, the plurality of thin film transistors are switched by signals transmitted along the gate lines and transfer signals transmitted along the data lines to each pixel electrode. In order to prevent light leakage, black matrix films are formed on the second glass substrate (color filter substrate) except at regions of the second glass substrate that correspond to the pixel regions of the first glass substrate.

A process for manufacturing an LCD device using a TFT substrate and a color filter substrate will be described with reference to a manufacturing apparatus according to the related art.

The process for manufacturing an LCD device according to the related art includes steps of forming a sealant pattern on one of a first and second substrate to form an injection inlet, bonding the first and second substrates to each other within a vacuum processing chamber, and injecting liquid crystal material through the injection inlet. In another process of manufacturing an LCD device according to the related art, a liquid crystal dropping method, which is disclosed in Japanese Patent Application No. 11-089612 and 11-172903, includes steps of dropping liquid crystal material on a first substrate, arranging a second substrate over the first substrate, and moving the first and second substrates, thereby bonding the first and second substrates to each other. Compared to the liquid crystal injection method, the liquid crystal dropping method is advantageous in that various steps such as, formation of a liquid crystal material injection inlet, injection of the liquid crystal material, and sealing of the injection inlet are unnecessary since the liquid crystal material is predisposed on the first substrate.

FIGS. 1 and 2 show cross sectional views of a substrate bonding device using the liquid crystal dropping method according to the related art. In FIG. 1, the substrate bonding device includes a frame 10, an upper stage 21, a lower stage 22, a sealant dispensor (not shown), a liquid crystal material dispensor 30, a processing chamber includes an upper chamber unit 31 and a lower chamber unit 32, a chamber moving system 40, and a stage moving system 50. The chamber moving system 40 includes a driving motor driven to selectively move the lower chamber unit 32 to a location at which the bonding process is carried out, or to a location at which outflow of the sealant occurs and dropping of the liquid crystal material. The stage moving system 50 includes another driving motor driven to selectively move the upper stage 21 along a vertical direction perpendicular to the upper and lower stages 21 and 22. A receiving system temporarily receives a substrate 52 at opposite diagonal portions of the substrate 52. The receiving system is attached to the upper stage 21, and includes a rotational axis 61 provided to extend from an exterior of the upper chamber unit 31 to an interior of the upper chamber unit 31, a rotational actuator 63 fixed to the exterior of the upper chamber unit 31 at one end of the rotational axis 61 and driven to selectively rotate the rotational axis 61, an elevating actuator 64 selectively elevating the rotational actuator 63, and a receiving plate 62 provided at the other end of the rotational axis 61 to form a single body with the rotational axis 61, thereby selectively supporting opposite edge portions of the substrate 52.

A process of manufacturing a liquid crystal display device using the substrate assembly device according to the related art follows. First, a second substrate 52 is loaded upon the upper stage 21, and a first substrate 51 is loaded upon the lower stage 22. Then, the lower chamber unit 32 having the lower stage 22 is moved to a processing location (S1) by the chamber moving system 40 for sealant dispensing and liquid crystal material dispensing. Subsequently, the lower chamber unit 32 is moved to a processing location (S2) for substrate bonding by the chamber moving system 40. Thereafter, the upper and lower chamber units 31 and 32 are assembled together by the chamber moving system 40 to form a vacuum tight seal, and a pressure in the chamber is reduced by a vacuum generating system (not shown). The elevating actuator 64 is driven to move the rotational axis 61 toward a lower part of the upper stage 21, and at the same time the rotational actuator 63 is driven to rotate the rotational axis 61 so that the receiving plate 62 is positioned at both edges of the second substrate 52 fixed to the upper stage 21.

FIGS. 2 and 3 show a perspective view of an operational state of a receiving system of a substrate assembly device according to a prior art. In FIGS. 2 and 3, when the stage moving system 50 moves the upper stage 21 downward in close corresponding to a height at which the receiving plate 62 is positioned.

When a vacuum state is achieved inside the assembled chamber, the second substrate 52 may fall from the upper stage 21 since the vacuum pressure within the chamber is larger than the vacuum force affixing the second substrate 52 to the upper stages 21. Accordingly, before the desired vacuum pressure within the chamber is achieved, it is necessary to keep the second substrate 52 temporarily affixed to the upper stage 21. Once the desired vacuum pressure within the chamber part is attained, the second substrate 52 is affixed to the upper stage 21 by application an electrostatic force to the upper stage 21. Accordingly, the receiving plates 62 and rotational axis 61 are returned to original standby locations by driving the rotational actuator 63 of the receiving system and the elevating actuator 64.

Then, the upper stage 21 is moved downward by the stage moving system 50 to closely fasten the second substrate 52 affixed to the upper stage 21 to the first substrate 51 affixed to the lower stage 22. In addition, the process for bonding the first and second substrates 51 and 52 to each other is carried out through a continuous pressurization process, thereby completing the manufacture of LCD device.

However, the device of assembling substrates according to the prior art is disadvantages. First, the receiving system is constructed to support only the corner portions of the second substrate 52. Thus, a middle portion of the second substrate 52 may become curved downward. Specifically, if the receiving system according to the prior art is applied to a manufacturing device for large-sized LCD device, the deflection of the substrate is attenuated because a thickness of the large-sized LCD devices is relatively thin. Accordingly, the deflection of the relatively thin substrate prevents the application of the receiving system according to the prior art.

Second, an overall size of each receiving plate 62 is considerably smaller than an overall size of the second substrate 52, thereby reducing contact areas between the second substrate 52 and the receiving plates 62. Furthermore, if the rotational axis 61 does not precisely rotate due to malfunctions of the rotational actuator, the contact areas between the receiving plates 62 and the second substrate 52 become insufficient to support the second substrate, thereby the second substrate 52 may fall from the receiving plates 62. In addition, if the receiving plates 62 according to the prior art are used to support large-sized LCD devices, the receiving plates 62 will not provide adequate support for the larger substrates. Specifically, the contact areas of the receiving plates 62 are significantly smaller than an entire area of the larger substrate.

Third, the substrate assembly device according to the prior art has an insufficient number of the receiving plates 62 to effectively manufacture large-sized LCD devices. Finally, as substrate models are reconfigured, dummy areas, at which the respective cell areas fail to be formed and which will be removed by 'breaking', are also changed. Thus, the receiving plates 62 according to the prior art cannot be revised in response to the reconfiguration of the substrate.

SUMMARY OF THE INVENTION

Accordingly, the present invention is directed to an apparatus and method for manufacturing a liquid crystal display device, a method for using the apparatus, and a device produced by the method that substantially obviates one or more problems due to limitations and disadvantages of the related art.

An object of the present invention is to provide an apparatus and method for manufacturing a liquid crystal display device having a substrate receiving system that can prevent a specific portion of a target substrate from being distorted, sufficiently support the overall substrate, and eliminate interference on operation of subsidiary devices with a structure supporting the substrate temporarily so as to prevent the substrate fixed to an upper stage during a process for achieving a vacuum state inside a vacuum chamber in the process of a vacuum bonding of a liquid crystal display.

Additional features and advantages of the invention will be set forth in part in the description which follows, and in part will become apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an apparatus for vacuum bonding a liquid crystal display device includes a unitary vacuum processing chamber, upper and lower stages provided within the vacuum processing chamber for supporting first and second substrates, and at least one first substrate receiving system provided within the vacuum processing chamber to contact dummy areas between cell areas of one of the first and second substrates.

In another aspect, a method manufacturing a liquid crystal display device includes introducing first and second substrates into a unitary vacuum processing chamber, loading the first and second substrates onto upper and lower stages within the vacuum processing chamber, and contacting dummy areas between cell areas of one of the first and second substrates within the vacuum processing chamber.

In another aspect, a liquid crystal display device is manufactured by a method of introducing first and second substrates into a unitary vacuum processing chamber, loading the first and second substrates onto upper and lower stages within the vacuum processing chamber, contacting dummy areas between cell areas of one of the first and second substrates within the vacuum processing chamber, and bonding the first and second substrates together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIG. 6A is a cross sectional view of an exemplary operational state of a substrate receiving system according to the present invention;

DETAILED DESCRIPTION OF THE INVENTION

Reference will now be made in detail to the preferred embodiments of the present invention, examples of which are illustrated in the accompanying drawings.

Figure 1:
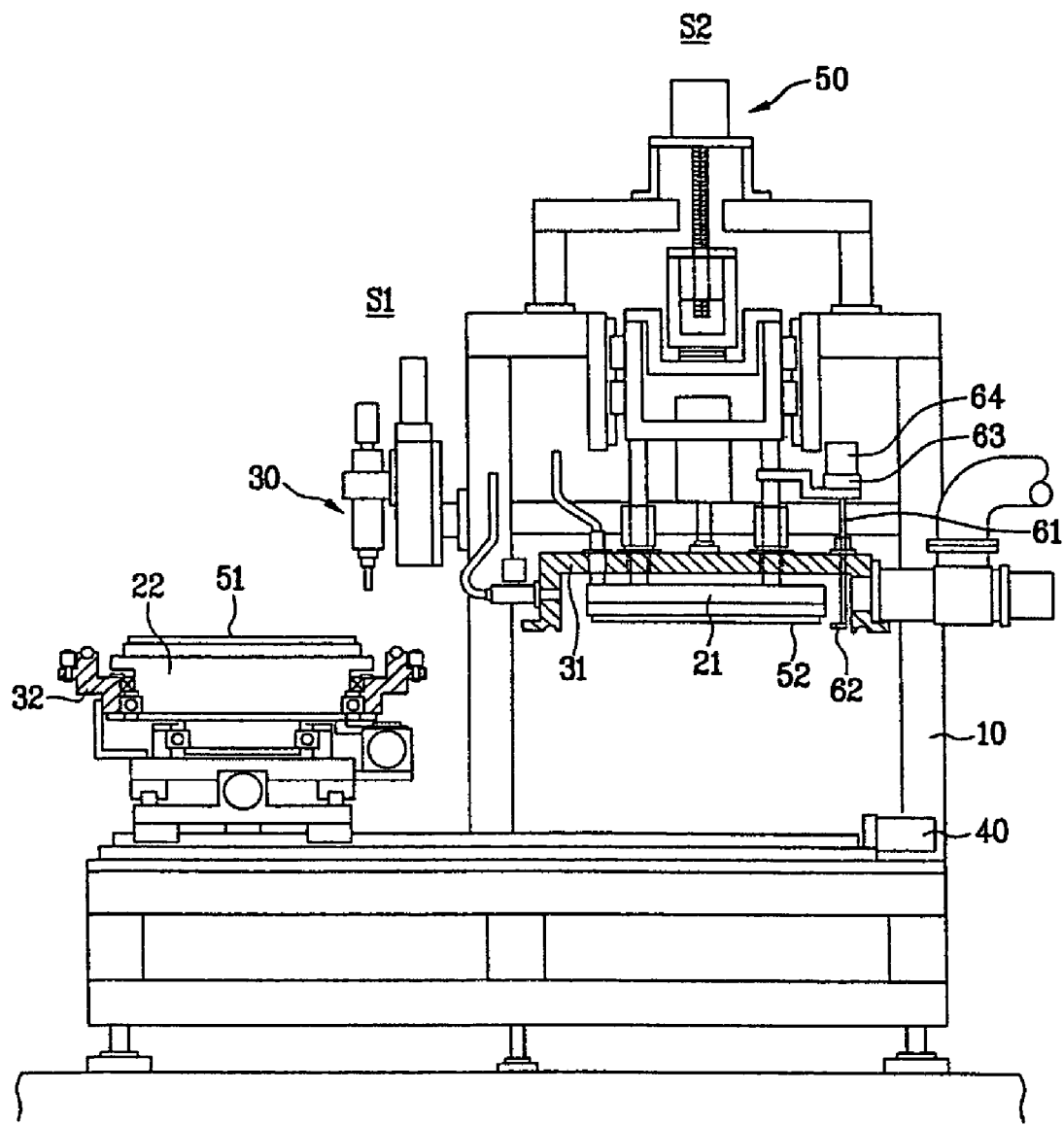
FIG. 1 shows a cross sectional view of a substrate bonding device prior to sealing of upper and lower chamber units according to the prior art.
Figure 2:
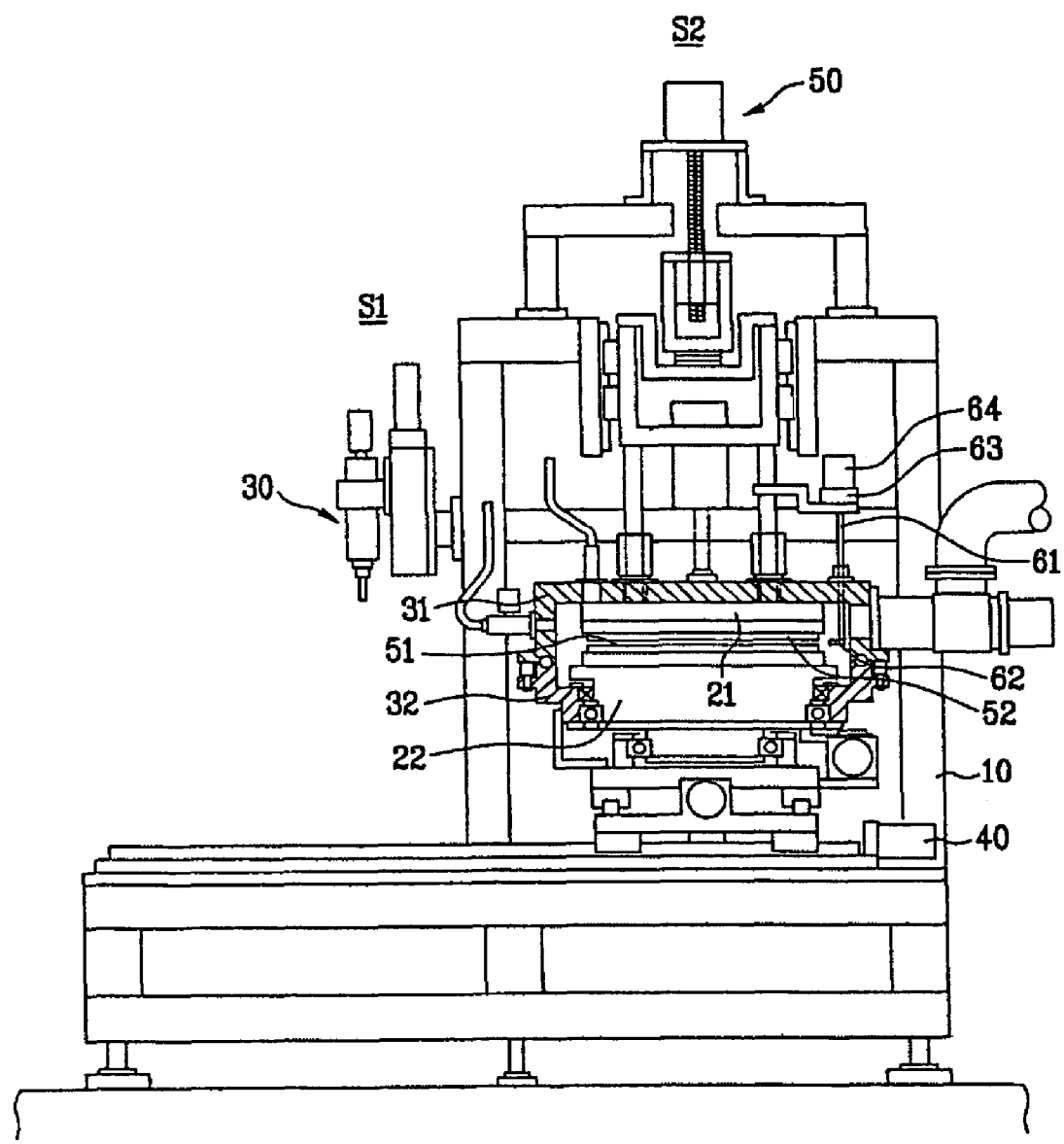
FIG. 2 shows a cross section view of the substrate bonding device during substrate bonding according to the prior art.
Figure 3:
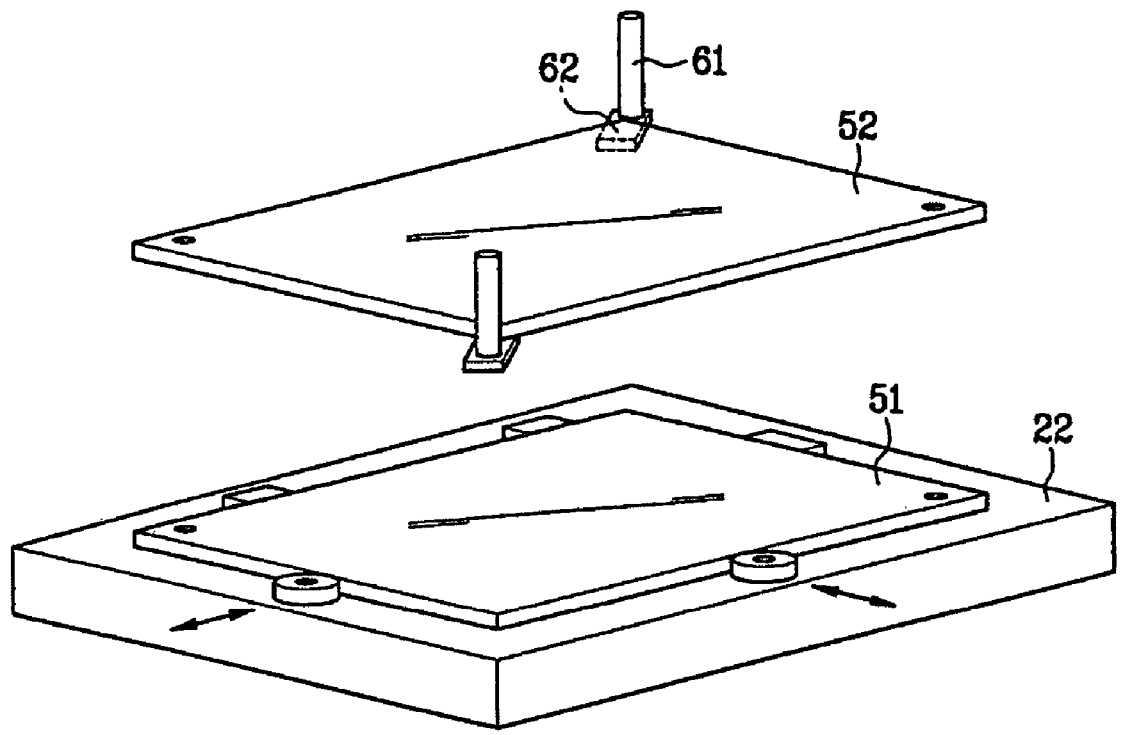
FIG. 3 shows a perspective view of an operational state of a receiving system of a substrate assembly device according to the prior art.
Figure 4:
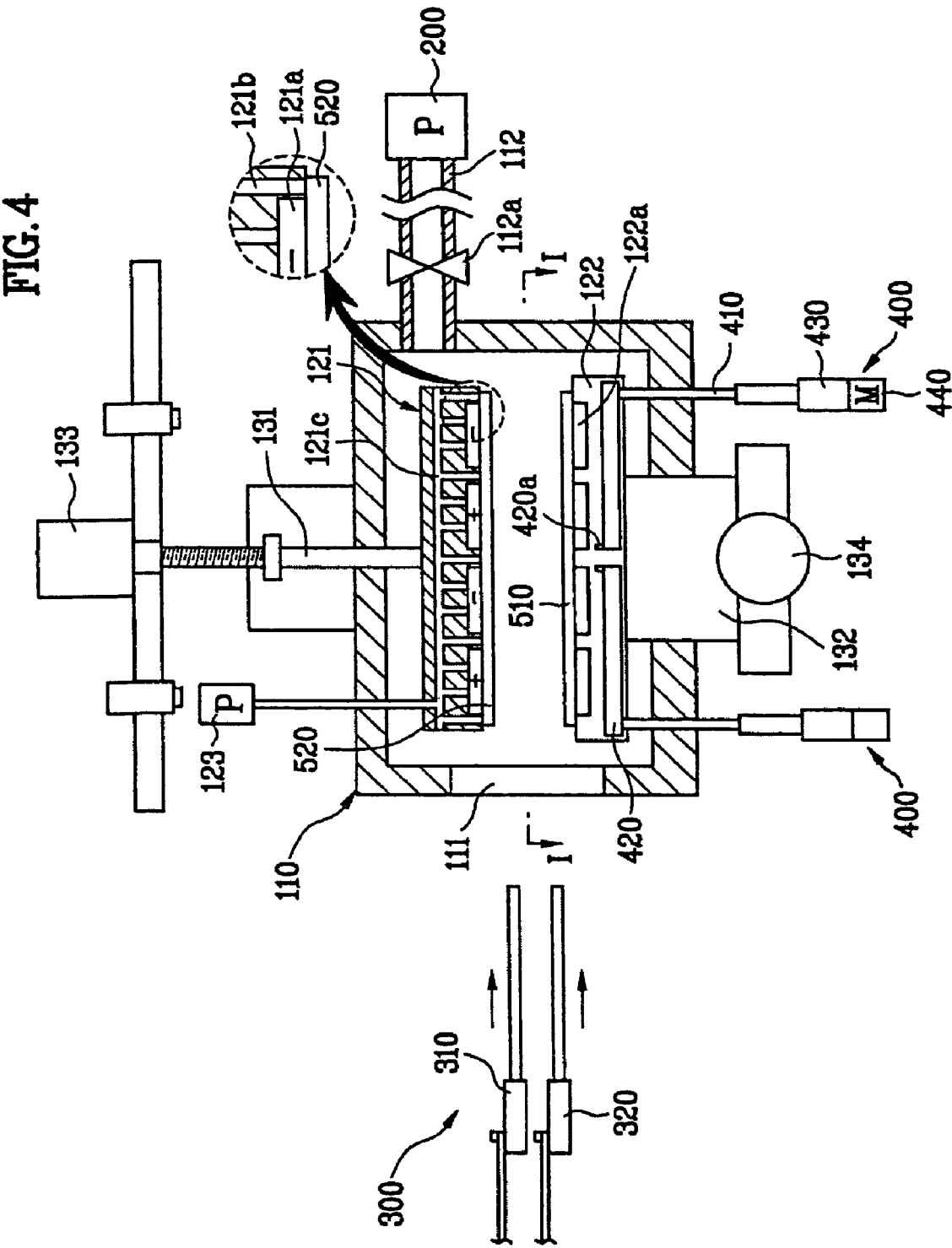
FIG. 4 is a cross-sectional view of an exemplary apparatus to which an exemplary substrate receiving system is applied according to the present invention.

FIGS. 4, 5A, 5B, 6A, and 6B illustrate an exemplary apparatus for vacuum bonding a liquid crystal display (LCD) device according to a first embodiment of the present invention. In FIG. 4, the apparatus may include a vacuum processing chamber 110, upper and lower stages 121 and 122, a stage moving device, a vacuum device 200, a loader part 300, and a substrate receiving system 400.

The vacuum processing chamber 110 may be formed such that bonding between upper and lower substrates is selectively carried out in one of a vacuum pressure state and an atmospheric pressure state within the vacuum processing chamber 110. To switch to the vacuum pressure state from an atmospheric pressure state, an air outlet 112 transfers a vacuum force to an inner space of the vacuum processing chamber 110 via an air outlet valve 112a.

The upper and lower stages 121 and 122 may be provided at upper and lower spaces within the vacuum processing chamber 110, respectively. The upper and lower stages 121 and 122 may receive first and second substrates 510 and 520 that are loaded into the vacuum processing chamber 110 via the loading part 300. The upper and lower stages 121 and 122 may each include an electrostatic chuck 121a and 122a for affixing the second and first substrates 520 and 510, respectively, onto opposing surfaces of the upper and lower stages 121 and 122. The upper stage 121 may also include a plurality of vacuum holes 121b formed along at least a circumference of the upper stage 121, and interconnected via pipelines 121c to transmit a vacuum force generated by a vacuum pump 123 to affix the second substrate 520 to a lower surface of the upper stage 121. The plurality of vacuum holes 121b may also be formed at a central portion of the upper substrate. Moreover, the lower stage 122 may also include a plurality of vacuum holes (not shown) formed along at least a circumference of the lower stage 122, and interconnected via pipelines (not shown) to transmit a vacuum force generated by a vacuum pump (not shown) to affix the first substrate 520 to an upper surface of the lower stage 122.

The electrostatic chucks 121a and 122a may include at least one pair of electrostatic plates of opposing polarities to which a direct voltage having the different polarities is applied respectively so as to enable the substrate to adhere thereto by an electrostatic force. Alternatively, the electrostatic force generated from the electrostatic chucks 121a and 122a may include at least one pair of electrostatic plates of similar polarities. In addition, the electrostatic chuck 122a may be mounted at a top surface of the lower stage 122, and may include at least one vacuum hole (not shown) provided along a circumference of the electrostatic chuck 122a. Moreover, the electrostatic chuck 122a and the at least one vacuum hole formed at the top surface of the lower stage 122 is not limited to the same construction of the upper stage 121. Preferably, the electrostatic chuck 122a and the at least one vacuum hole at the top surface of the lower stage 122 are arranged so as to consider the overall shape of a target substrate, and the respective liquid crystal dispensing areas.

The stage moving device includes a moving axis 131 selectively driven to move the upper stage 121, a rotational axis 132 selectively driven to rotate the lower stage 122, and driving motors 133 and 134 coupled axially with the upper and lower stages 121 and 122, respectively, at one of the exterior and interior of the vacuum processing chamber 110 to drive the axes, respectively. Accordingly, the stage moving device is not limited to the device moving the upper stage 121 up and down or the lower stage 122 right and left. Preferably, the stage moving device enables movement of the upper stage 121 along a horizontal direction, and movement of the lower stage 122 along a vertical direction. In addition, a subsidiary rotational axis (not shown) may be incorporated into the upper stage 121 to enable rotation of the upper stages 121, and a subsidiary moving axis (not shown) may be incorporated into the lower stage 122 to enable the vertical movement.

The loader part 300 may be arranged at the exterior of the vacuum processing chamber 110 separately from various elements provided inside the vacuum processing chamber 110. The loader part 300 may include a first arm 310 to carry the first substrate 510 upon which at least the liquid crystal material is disposed into the vacuum processing chamber 110, and a second arm 320 to carry the second substrate 520 into the vacuum processing chamber 110. Alternatively, the first substrate 510 may have both the liquid crystal material and the sealant disposed on a surface thereof, wherein the first substrate may be one of a TFT array substrate and a color filter (C/F) substrate. The first arm 310 is disposed over the second arm 320 so that contaminating particles from the second substrate 520 will not fall upon the first substrate 510.

The substrate receiving system 400 may contact a portion of the second substrate 520 at dummy areas particularly located between cell areas formed on the second substrate 520. Each of the substrate receiving system 400 may include a rotational axis 410, a support 420, a support protrusion, and a driving part 430. The substrate receiving system 400 may be provided at an interior bottom portion of the vacuum processing chamber 110 adjacent to sides of the lower stage 122. Accordingly, a total number of the substrate receiving system 400 may be about 2 to 10.

Figure 5A:
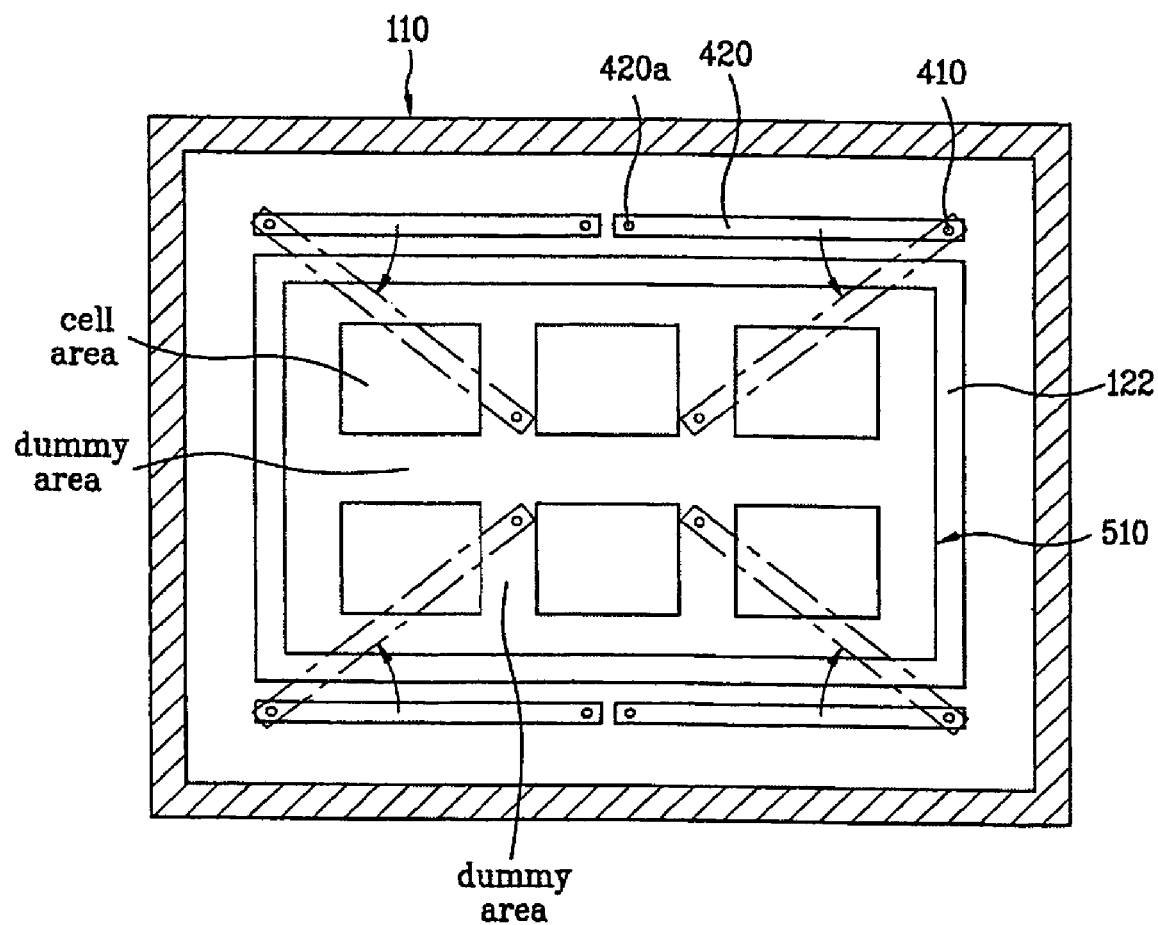
FIG. 5A is a plane view of the exemplary substrate receiving system along I-I of FIG. 4 according to the present invention.
Figure 5B:
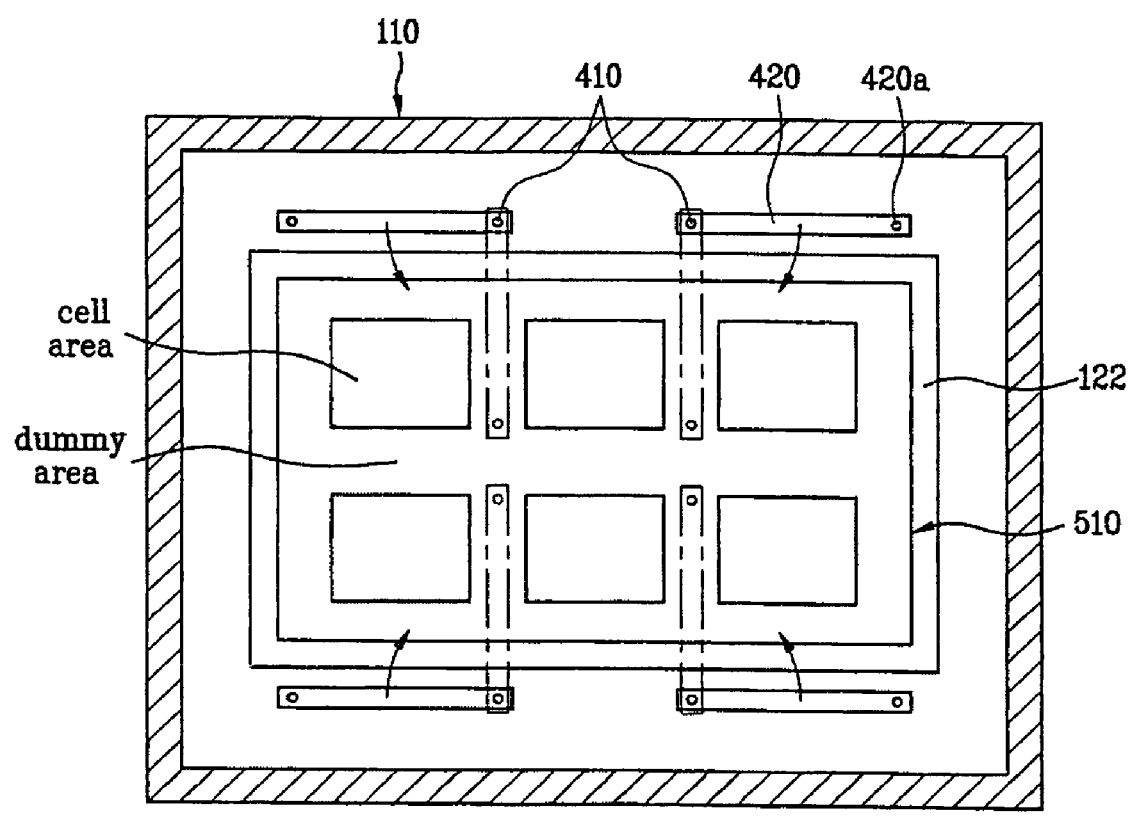
FIG. 5B is a plane view of another exemplary substrate receiving system along line I-I of FIG. 4 according to the present invention.

FIGS. 5A and 5B are a plane views of the exemplary substrate receiving system along line I-I of FIG. 4 according to the present invention. In FIG. 5A, one end of the support 420 to which the rotational axis 410 is coupled may be placed at the interior bottom portion of the vacuum processing chamber 110, which corresponds to a corner portion of one of a long side and a short side of each of the upper and lower stages 121 and 122. Specifically, the substrate receiving system 400 may be provided at a vicinity of one corner portion or both corners portions of one side of the lower stage 122 or at a vicinity of one corner portion or both corner portions of the other side of the lower stage 122. In FIG. 5B, one end of the support 420 to which the rotational axis 410 is coupled may be placed at the interior bottom portion of the vacuum processing chamber 110, which corresponds to a middle portion of one of a long side and a short side of each of the upper and lower stages 121 and 122. Specifically, the substrate receiving system 400 may be provided at a vicinity of a central portion of one or the other side of the lower stage 122, or may be provided at each corner and central portions simultaneously. When the substrate receiving system 400 is provided at the vicinity of the central portion of one side or the other side of the lower stage 122, it is also possible to provide a plurality of substrate receiving system 400.

In FIG. 5A, the supports 420 may be constructed of individual bodies each having a first end attached at the rotational axis 410 corresponding to a corner region of the lower stage 122, and a second end having a support protrusion 420a corresponding to a central region of the lower stage 122. The supports 420 may be formed at a first position along a direction parallel to the long side of the upper and lower stages 121 and 122. During extension of the supports 420, each of the rotational axis 410 rotate the supports 420 from the first position to a second position in which each of the support protrusions 420a are disposed at a region corresponding to one of the dummy areas. Alternatively, the supports 420 may be formed along a direction parallel to the short side of the upper and lower stages 121 and 122. However, it may be preferable to provide the substrate receiving system 400 along the direction parallel to the long side of the upper and lower stages 121 and 122 in order to provide sufficient margin space.

Each of the support protrusions 420a may be formed at top portions of the supports 420 to reduce a contact area between the supports 420 and the second substrate 520. The support protrusions 420a are disposed along the supports 420 such that when the support 420 is positioned under the upper stage 121, the support protrusions 420a contact the dummy areas of the second substrate 520. Each of the support protrusions 420a may have a same protruding height, or each of the support protrusions 420a may have different relative heights. Moreover, each of the support protrusions 420a may have individually adjustable heights and each support 420 may have a plurality of at least one support protrusion 420a. When at least two support protrusions 420a are formed at a top surface of the support 420, an interval between the at least two support protrusions 420a may be selected to prevent a displacement of the second substrate 520. In addition, the interval between the at least two support protrusions 420a may be less than a corresponding distance between adjacent cell areas such that the at least two support protrusions 420a contact the second substrate with the dummy area.

Each of the driving parts 430 of the substrate receiving system 400 may include a cylinder to provide a vertical movement of the rotational axis 410 and a rotational motor 440 that rotates the rotational axis 410. The cylinder may operate using a one, or both of hydraulic or pneumatic control. Alternatively, the driving part 430 may include both the cylinder and the rotational motor 440, wherein the cylinder moves the rotational axis 410 along a vertical plane and the rotational motor 440 rotates the rotational axis 410 along a horizontal plane. Moreover, the cylinder may rotate the rotational axis 410 along the horizontal plane, and the rotational motor 440 may move the rotational axis 410 along the vertical plane.

During deployment of the substrate receiving system 400, the supports 420 may be elevated from a home position to a first position along the vertical direction above an upper surface of the lower stage, and thus above an upper surface of the first substrate 510, via one of the cylinder and rotational motor 440. Once the supports 420 have been elevated above the upper surface of the first substrate 510, the rotational motor 440 rotates the supports 420 about the rotational axis 410 to a second position in which the support protrusions 420a are disposed adjacent to the dummy areas of the second substrate 520. Consideration must be given regarding the home position of the supports 420. Specifically, the home position of the support 420 should be determined such that an upper surface of each of the support protrusions 420a should be lower than a top surface of the lower stage 122 to prevent any possible interference with a lower surface of the first substrate 510. Furthermore, consideration should be given to the first and second arms 310 and 320 of the loader part 300 such that the substrate receiving system 400 does not interfere with loading and unloading of the first and second substrates 510 and 520.

Each of the driving parts 430 may be disposed at the exterior of the vacuum processing chamber 110. Specifically, the rotational axis 410 may be provided to penetrate the bottom portion of the vacuum processing chamber 110, and a sealing system (not shown) may be provided to prevent air from entering into the vacuum processing chamber 110 during a vacuum pressure state.

A process for using the apparatus to bond substrates according to the present invention will now be explained with reference to FIGS. 4, 6A, and 6B.

In FIG. 4, a loading process is conducted wherein the loader part 300 controls the first and second arms 310 and 320 to receive the first and second substrates 510 and 520. The first substrate 510 includes at least the liquid crystal material disposed on a first surface of the first substrate 510. As previously explained, the first substrate 510 may include both the liquid crystal material and the sealant, and the first substrate 510 may include one of the TFT array substrate and the C/F substrate. Once the first and second arms 310 and 320 retrieve the first and second substrates 510 and 520, respectively. The loader part 300 controls the second arm 320 to provide the second substrate 520 onto the lower surface of the upper stage 121. Accordingly, the vacuum pump 123 provides the necessary vacuum force to the upper stage 122 to transfer the second substrate 520 from the second arm 320 to the lower surface of the upper stage 121. Thus, the second substrate 520 provided by the second arm 320 is affixed to the upper stage 121 by the vacuum force generated by the vacuum pump 123.

During the loading process, if a bonding process of the first and second substrates 510 and 520 has been previously performed, then the bonded substrates remain on the lower stage. Accordingly, the second arm 320 may unload the bonded substrates remaining on the lower stage 122 after loading the second substrate 520 onto the upper stage 121. Then, the bonded substrates may be removed from the vacuum processing chamber 110, and transferred to another processing step by the second arm 320, thereby shorten process time of the bonded substrates.

After the second arm 320 has transferred the bonded substrates, the loader part 300 controls the first arm 310 to provide the first substrate 510 upon which at least the liquid crystal material is disposed onto an upper surface of the lower stage 122. Accordingly, the vacuum pump (not shown) associated with the lower stage 122 provides the necessary vacuum force to the lower stage 122 to transfer the first substrate 510 from the first arm 310 to the upper surface of the lower stage 122. Thus, the first substrate 510 loaded by first arm 310 is affixed to the lower stage 122 by the vacuum force generated by the vacuum pump (not shown) that is associated with the lower stage 122. After loading the first substrate 510 onto the lower stage 122, the first arm 310 of the loader part 300 exits the vacuum processing chamber 110.

Once both of the first and second substrates 510 and 520 have been loaded onto the upper and lower stages 121 and 122, respectively, the shield door 114 provided at the entrance 111 of the vacuum processing chamber 110 close the entrance 111. The shield door 114 provides for a vacuum tight seal with the vacuum processing chamber 110.

Next, a vacuum process is started where the vacuum device 200 is actuated to generate a vacuum force while the switch valve 112a provided at the air outlet 112 of the vacuum processing chamber 110 keeps the air outlet 112 open. The vacuum force generated by the vacuum device 200 is transferred to the interior of the vacuum processing chamber 110, thereby gradually reducing the pressure at the interior of the vacuum processing chamber 110.

Figure 6B:
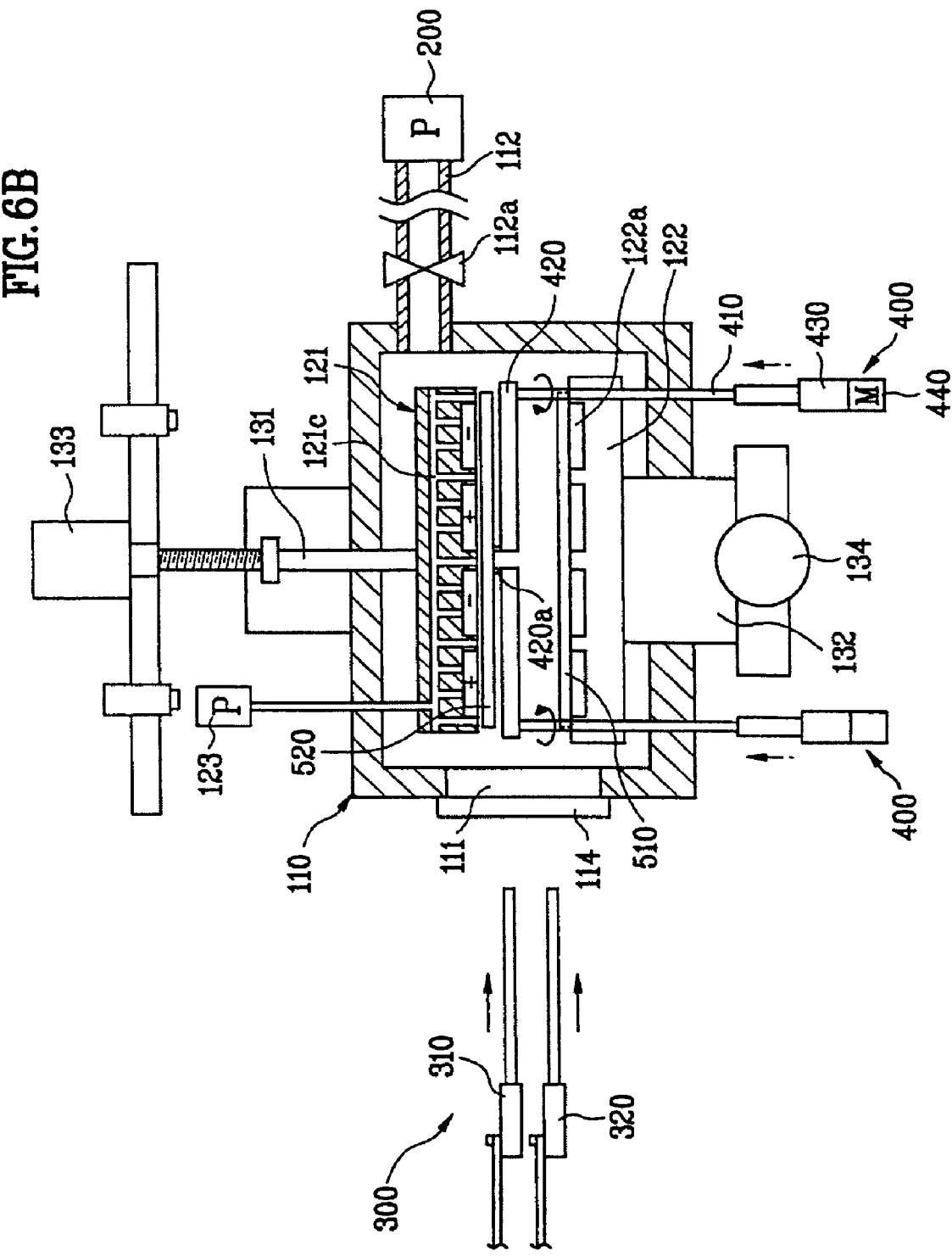
FIG. 6B is a cross sectional view of another exemplary operational state of the substrate receiving system receiving a substrate in FIG. 4 according to the present invention.

During the vacuum process, a substrate receiving process is performed wherein the substrate receiving system 400 activates the cylinders and rotational motors 440 to position the supports 420 beneath the lower surface of the second substrate 520, as shown in FIG. 6A. Specifically, the support protrusions 420a of each of the supports 420 are positioned adjacent to the dummy areas of the second substrate 520. Then, the vacuum pump 123 is disabled, thereby removing the vacuum force from the upper stage 121. Accordingly, the second substrate 520 falls from the upper stage 121 by release of the vacuum force, as shown in FIG. 6B, and the lower surface of the second substrate 520 contacts each of the support protrusions 420a of each of the supports 420. Alternatively, the supports 420 may be positioned such that the support protrusions 420a abut the lower surface of the second substrate 520. Accordingly, when the vacuum force is removed from the upper stage 121, the second substrate 520 does not necessary fall from the upper stage 121, thereby preventing any damage to the second substrate 520 by contact to the support protrusions 420a.

Meanwhile, once the vacuum pressure at the interior of the vacuum processing chamber 110 has been attained, the air outlet valve 112a is enabled to close the air outlet 112, and the vacuum device 200 is stopped. However, the substrate receiving process may to be executed after the vacuum process is completed, or prior to a start of the vacuum process. Alternatively, the substrate receiving process may be performed prior to the sealing of the vacuum processing chamber 110 by the shield door 114. Moreover, the substrate receiving process may begin once the second substrate 520 has been transferred onto the upper stage 121.

Once the vacuum process has been competed, an electrostatic process may begin wherein the upper and lower stages 121 and 122 may apply an electric power to the electrostatic chucks 121a and 122a, respectively, thereby electrostatically affixing the second and first substrates 520 and 510 to the upper and lower stages 121 and 122, respectively. Then, the substrate receiving system 400 may be enabled to return the supports 420 to the home position.

Once the substrate receiving system 400 have returned to the home position, an alignment process may be performed to align the first and second substrates 510 and 520. The alignment process may include an alignment system, wherein lateral and rotational adjustments of one or both of the upper and lower stages 121 and 122 may be performed. Once the alignment process is completed, a bonding process wherein the upper and lower drive motors 133 and 134 may move one or both of the upper and lower stages 121 and 122 to bonding the first and second substrates 510 and 520 together may be performed.

After completion of the bonding process, the vacuum pressure at the interior of the vacuum processing chamber 110 may be decreased by a vacuum release valve (not shown) that may be attached to the vacuum processing chamber 110. Then, once the pressure at the interior of the vacuum processing chamber 110 attains ambient atmospheric pressure, the shield door 114 of the vacuum processing chamber 110 may be driven to open the entrance 111. Finally, the bonded substrates may be unloaded by the second arm 320 of the loader part 300, and the loading process is started again.

Figure 7:
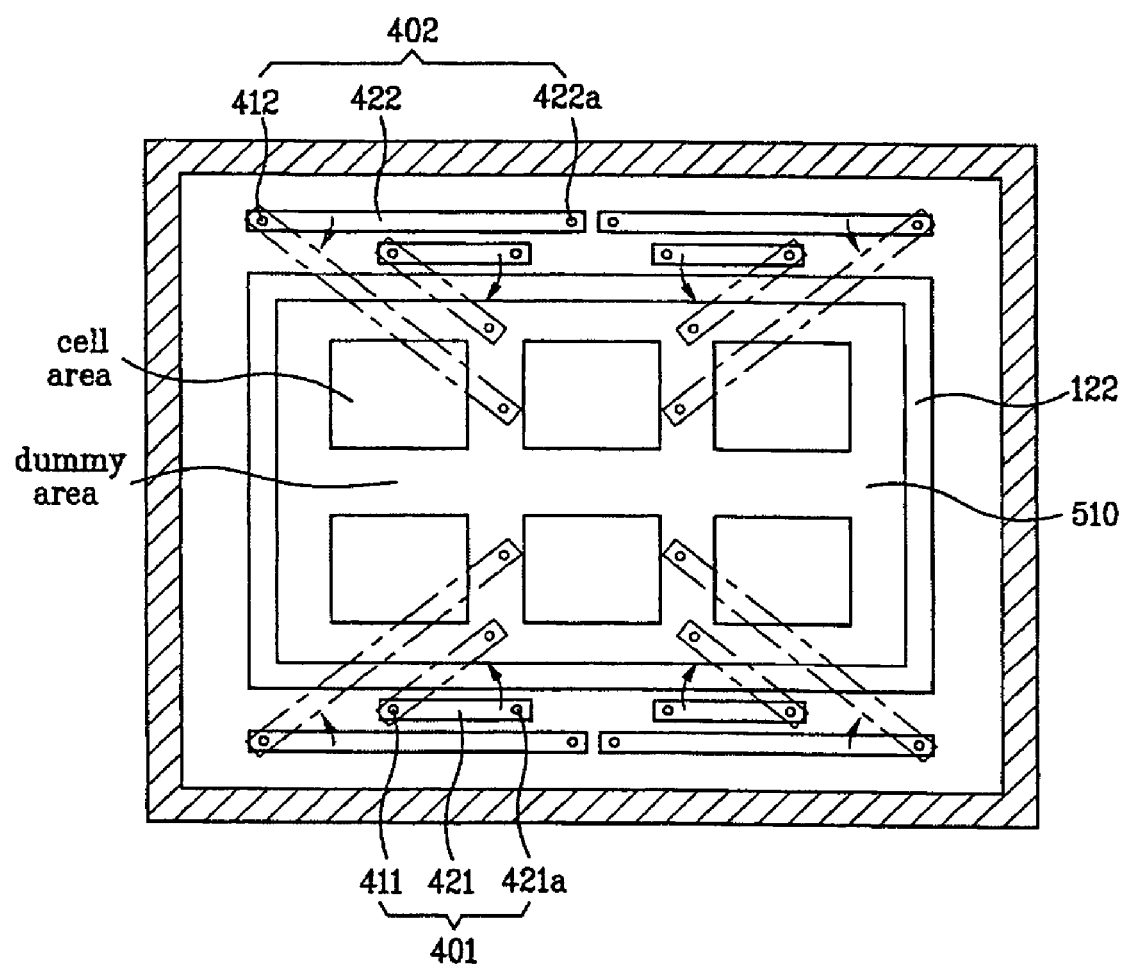
FIG. 7 is a plane view of an exemplary substrate receiving system according to the present invention.
Figure 8:
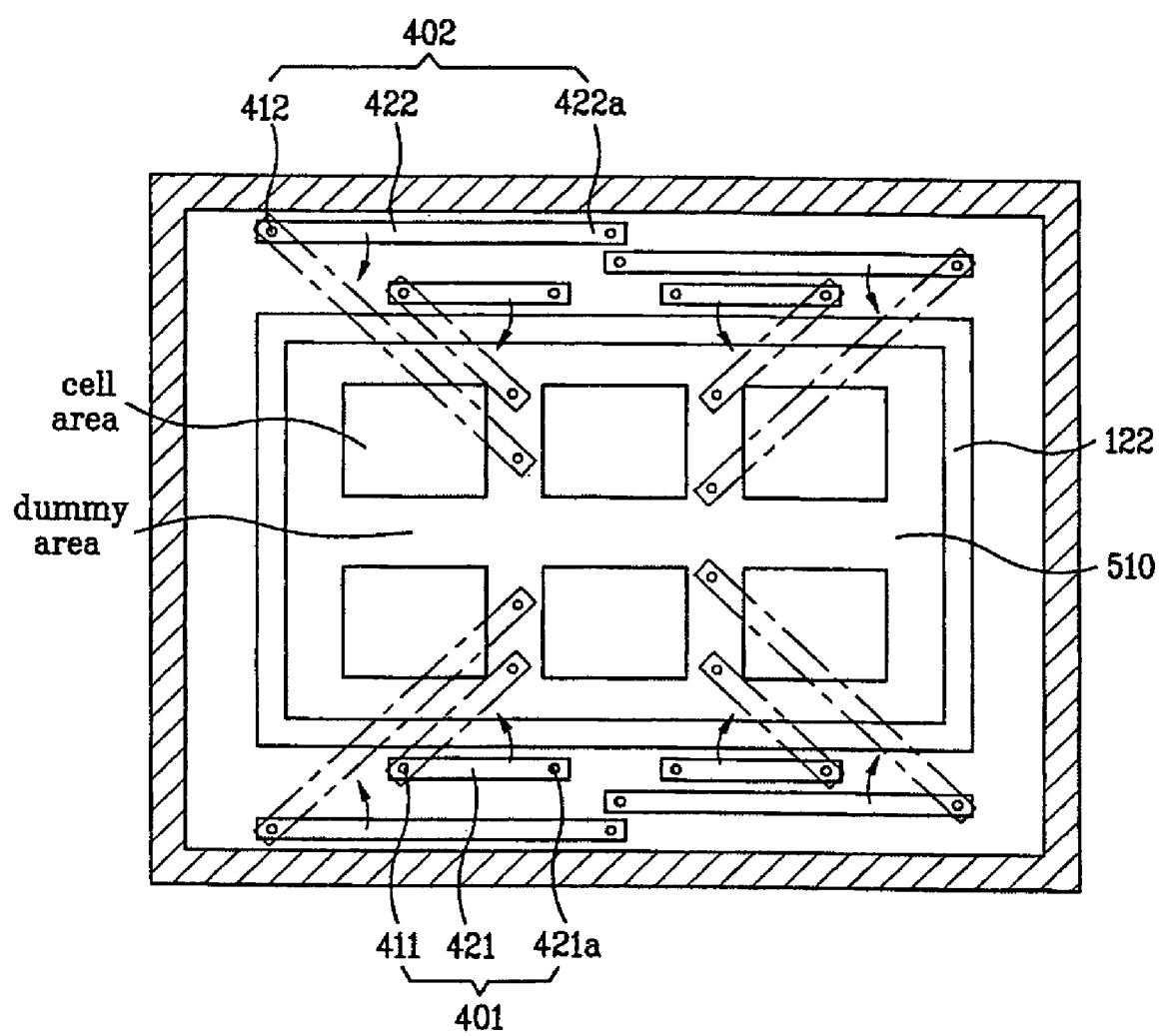
FIG. 8 is a plane view of an apparatus having another exemplary substrate receiving system.

FIGS. 7 and 8 are plane views of exemplary substrate receiving systems according to the present invention. In FIG. 7, a first substrate receiving system 401 and a second substrate receiving system 402 may be incorporated into the apparatus according to the present invention. The first substrate receiving system 401 may include a first rotational axis 411, a first support 421, and a first support protrusion 421a. The second substrate receiving system 402 may include a second rotational axis 412, a second support 422, and a second support protrusion 422a. The first support 421 of the first substrate receiving system 401 may be provided near a middle portion or corner portion of the lower stage 121, and may be formed to be shorter than the second support 422 of the second substrate receiving system 402. The first substrate receiving system 401 may be provided closer to the lower stage 122 than the second substrate receiving system 402. Accordingly, the first supports 421 of adjacent first substrate receiving systems 401 are arranged along a first line, and the second supports 422 of adjacent second substrate receiving systems 402 are arranged along a second line parallel to the first line. Moreover, each of the adjacent first substrate receiving systems 401 and each of the adjacent second substrate systems 402 are symmetrically disposed about the lower stage 121.

In FIG. 8, the first supports 421 at a first side of the lower stage 122 are arranged along a first line, and the second supports 422 at the first side of the lower stage 122 are not arranged along a second line. Specifically, the second supports 422 at the first side of the lower stage 122 are offset.

In FIGS. 7 and 8, the first rotational axis 411 of the first substrate receiving system 401 may be formed to be reciprocally offset to the second rotational axis 412 of the second substrate receiving system 402. In addition, the second rotational axis 412 may be formed to be closer to a short side of the lower stage 122 than the first rotational axis 411, whereby the first and second rotational axes 411 and 412 enable a reciprocal crossing operation. Accordingly, the reciprocal offset prevents reciprocal interference by the rotation of the first support 421 of the first substrate receiving system 401 and the second support 422 of the second substrate receiving system 402. Moreover, a timing sequence of the first and second substrate receiving systems 401 and 402 are different, thereby further preventing the reciprocal interference.

The first and second substrate receiving systems 401 and 402 are arranged at each corner of each long side of the lower stage 122 in a direction of the long side of the lower stage 122 so as to confront each other. Accordingly, the first and second substrate receiving systems 401 and 402 may be formed to cross each other. Furthermore, the first and second substrate receiving systems 401 and 402 may support the second substrate so as not to pass the cell areas but to traverse the dummy area in a straight line. The first and second substrate receiving systems 401 and 402 may be provided at the long sides of the lower stage 122, since the short sides of the lower stage 122 fail to provide sufficient margin space. Thus, the first and second substrate receiving systems 401 and 402 are provided at a vicinity of the long sides of the lower stage 122.

During the substrate receiving process, four of the second substrate receiving systems 402 operate to move to a work position, thereby enabling support of a specific portion of the second substrate 520. Specifically, the second rotational axes 412 of the four second substrate receiving systems 402 move along an upward direction, and then rotate in clockwise and counterclockwise directions to place each of the second supports 422 beneath the second substrate 520. Accordingly, the second support protrusions 422a are positioned beneath the second substrate 520 within the dummy areas of the second substrate 520. However, the substrate receiving process for the substrate receiving system of FIG. 8 must be performed in a slightly different sequence. In FIG. 8, the second rotational axes 412 at a first end of the lower stage 122 must first be rotated in clockwise and counterclockwise directions, and the second rotational axes at a second end of the lower stage 122 must be rotated next in clockwise and counterclockwise directions. Thus, the second supports 422 at the first end of the lower stage 122 do not interfere with the second supports 422 at the second end of the lower stage 122. Likewise, the sequence must be reversed when moving the second substrate receiving system 402 into the home position.

Then, the first rotational axes 411 of the four first substrate receiving systems 401 move upward, and rotate in a similar direction to the second substrate receiving system 402 to position the second supports 422 to a work position, thereby enabling support of a specific portion of the second substrate 520. Specifically, the first rotational axes 411 of the four first substrate receiving systems 401 move along an upward direction, and then rotate in clockwise and counterclockwise directions to place each of the first supports 421 beneath the second substrate 520. Accordingly, the first support protrusions 421a are positioned beneath the second substrate 520 within the dummy areas of the second substrate 520.

During the previously described substrate receiving process, the vacuum force transferred through the vacuum holes 121b of the upper stage 121 is released. Alternatively, the vacuum pressure at the interior of the vacuum processing chamber 110 may become higher than the vacuum force transferred through the vacuum holes 121b of the upper stage 121. Accordingly, the second substrate 520 affixed to the upper stage 121 falls along a gravitational direction to be placed on the first and second support protrusions 421a and 422a of the first and second substrate receiving systems 401 and 402, respectively. Alternatively, the first and second support protrusions 421a and 422a may be placed to contact the lower surface of the second substrate 520 such that the second substrate 520 does not fall after the vacuum force applied by the upper stage 121 is released. Accordingly, any damage to the second substrate 520 may be prevented.

Once the vacuum process has been competed, an electrostatic process may begin wherein the upper and lower stages 121 and 122 may apply an electric power to the electrostatic chucks 121a and 122a, respectively, thereby electrostatically affixing the second and first substrates 520 and 510 to the upper and lower stages 121 and 122, respectively. Then, the first and substrate receiving systems 401 and 402 may be enabled to return the first and second supports 421 and 422 to the home position. Then, the alignment process and bonding process may be carried out.

Figure 9:
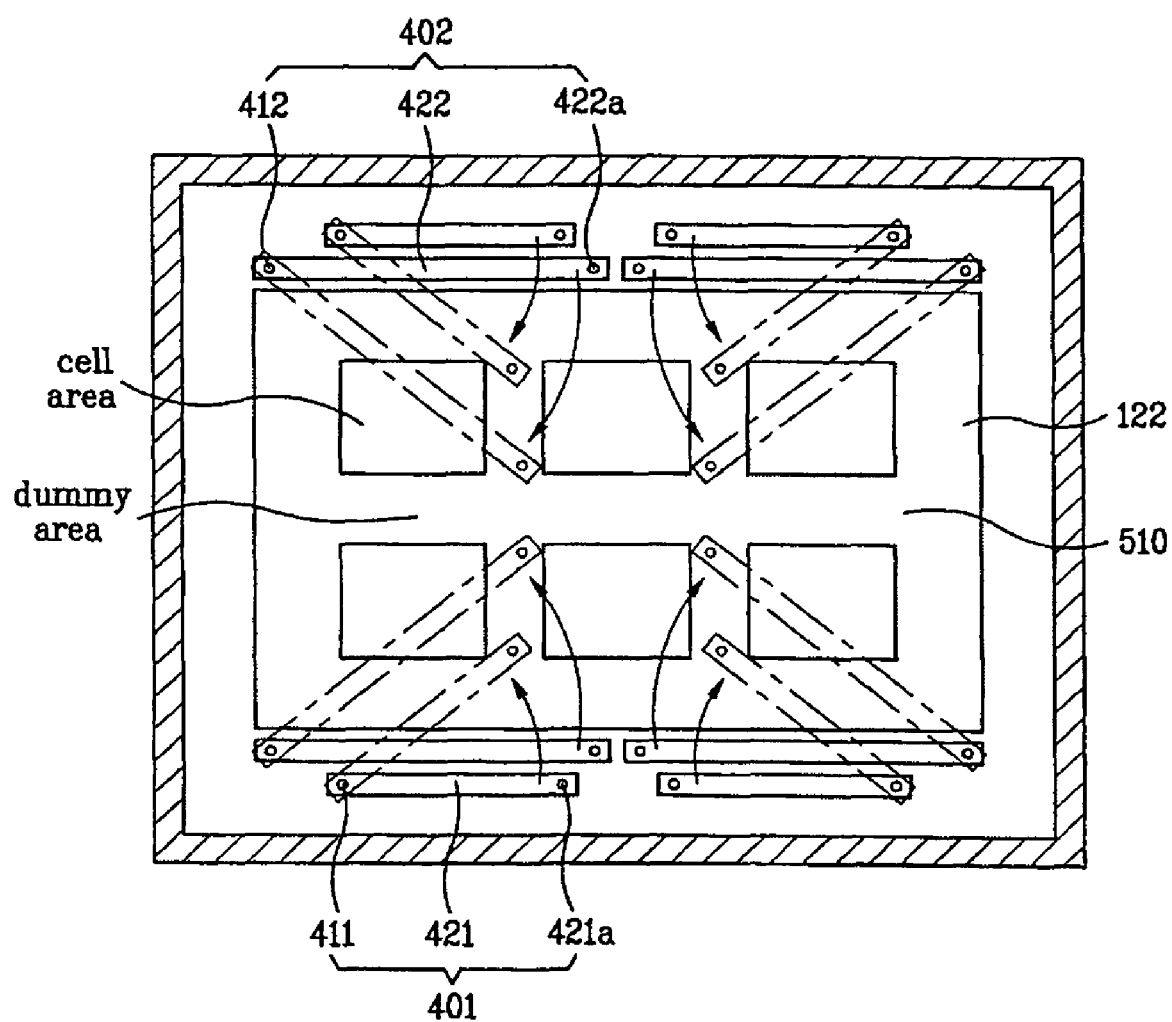
FIG. 9 is a plane view of an apparatus having another exemplary substrate receiving system.

FIG. 9 is a plane view of an apparatus having another exemplary substrate receiving system. In FIG. 9, the second substrate receiving system 402 may be positioned closer to a central portion inside the vacuum processing chamber 110 (i.e., farther from an inner wall of the vacuum processing chamber 110) than the first substrate receiving system 401.

In FIGS. 7, 8, and 9, lengths of the second supports 422 of the second substrate receiving system 402 may be about 500~1200 mm, and the first supports 421 of the first substrate receiving system 401 may be 100~500 mm. Preferably, the second supports 422 of the second substrate receiving system 402 is about 600 mm, and the first supports 421 of the first substrate receiving system 401 is about 400 mm. In general, the second supports 422 of the second substrate receiving system 402 may be at least longer than one-third of a long side of the second substrate 520, and the first supports 421 of the first substrate receiving system 401 may be at least longer than one-fifth of the lone side of the second substrate 520. Accordingly, even if reciprocal operation between the first and second substrate receiving systems 401 and 402 are carried out simultaneously, reciprocal interference fails to occur. Thus, a transit time of the first and second substrate receiving systems 401 and 402 is reduced and overall processing time is reduced.

Figure 10:
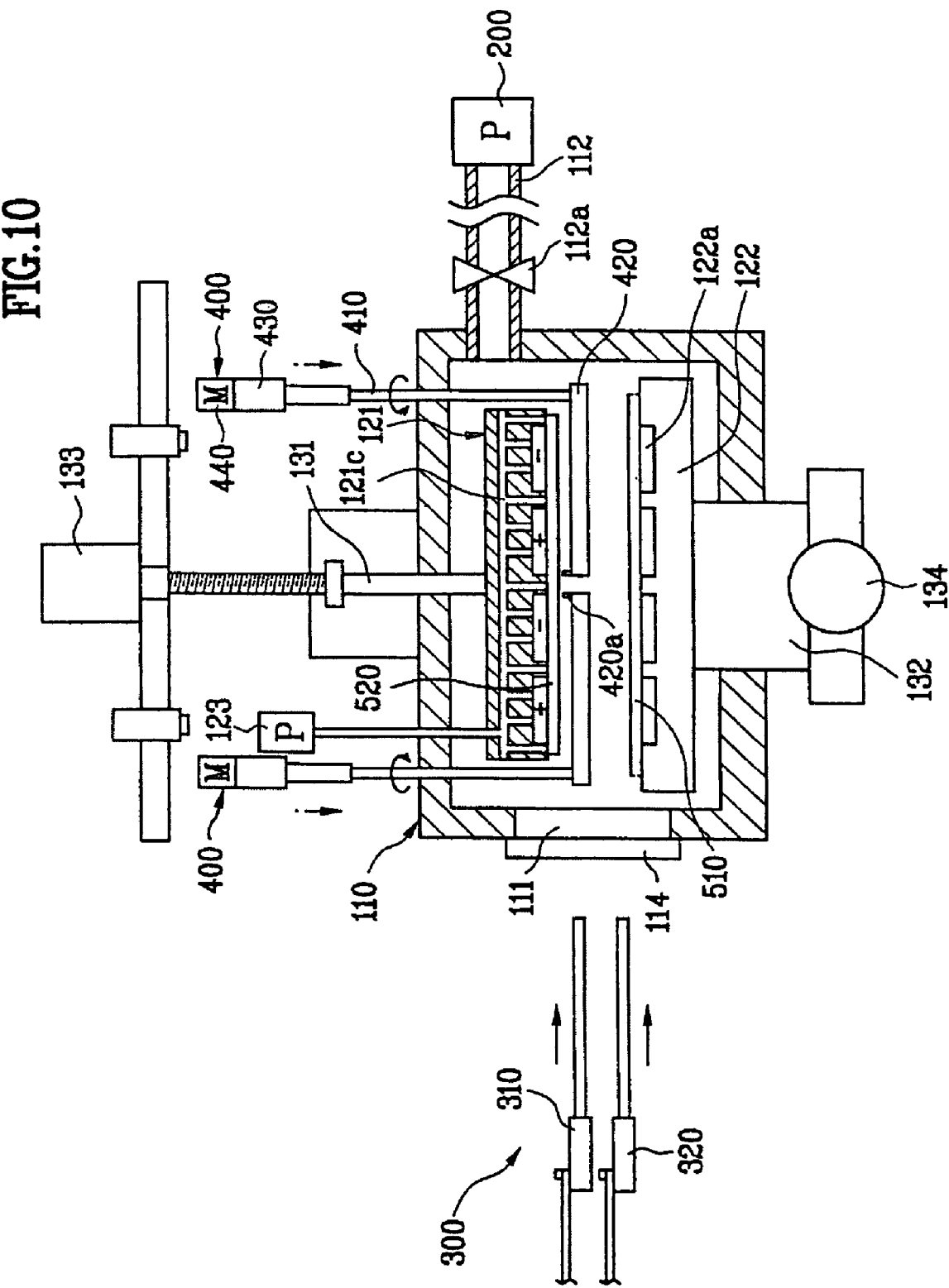
FIG. 10 is a cross sectional view of an exemplary substrate receiving system according to the present invention.

The present invention is not limited to the first and second substrate receiving systems 401 and 402 being disposed at the interior bottom portion of the vacuum processing chamber 110. FIG. 10 is a cross sectional view of another exemplary substrate receiving system according to the present invention, and FIG. 11 is a plane view of another exemplary substrate receiving system according to the present invention.

Figure 11:
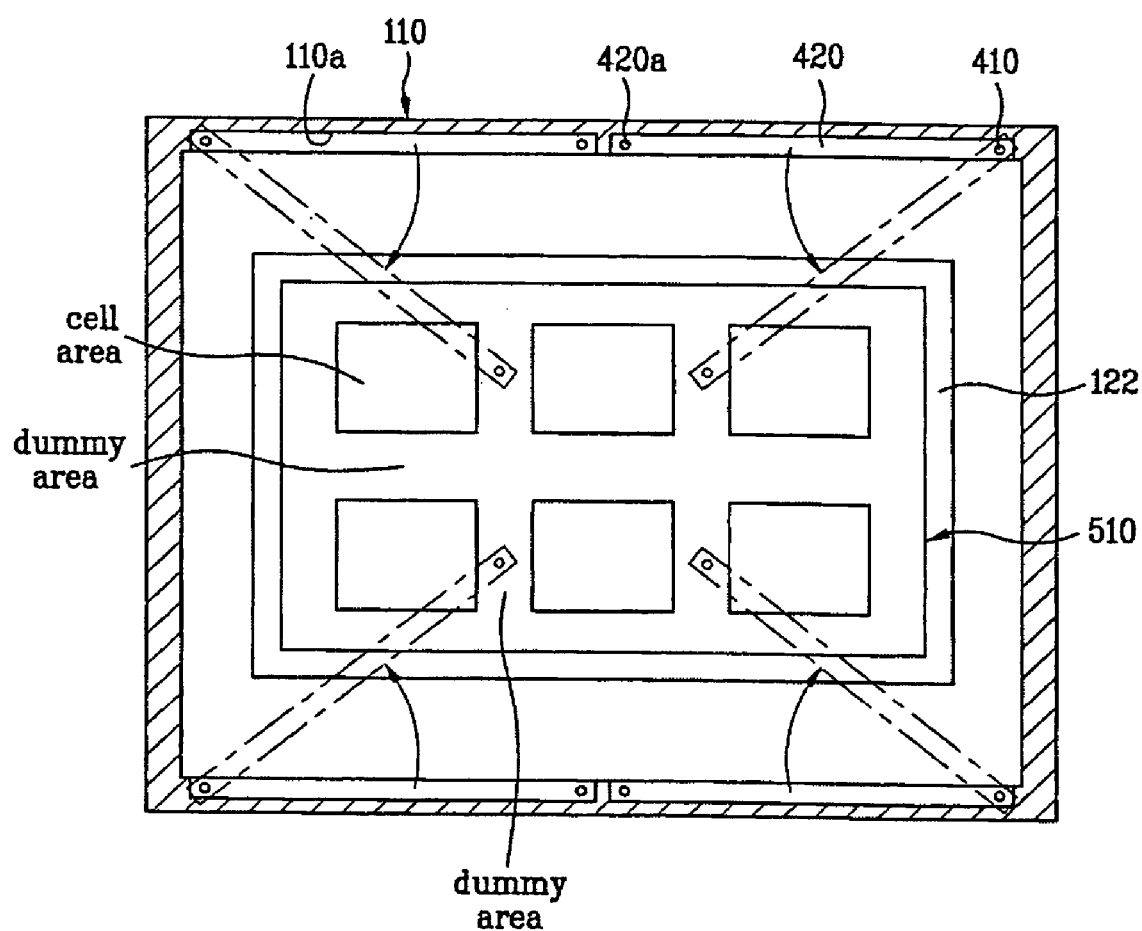
FIG. 11 is a plane view of another exemplary substrate receiving system according to the present invention.

In FIG. 10, an exemplary respective substrate receiving system may be provided at an interior top portion of the vacuum processing chamber 110 as well as an inner wall of the vacuum processing chamber 110, as shown in FIG. 11. Accordingly, if the substrate receiving system 400 according to the present invention is provided at the interior top portion of the vacuum processing chamber 110, an overall construction (i.e., positions of the rotational axes 410 and supports 420 at the interior of the vacuum processing chamber 110) is similar of exemplary substrate receiving systems of FIGS. 7, 8, and 9. However, locations of the driving parts of the substrate receiving system 400, locations of the rotational axes 410 coupled axially with the driving parts, and the downward movements of the rotational axes 410 are inverted. Moreover, if the substrate receiving system 400 is provided at the inner wall of the vacuum processing chamber 110, recesses 110a corresponding to the respective supports may be formed at the interior wall of the vacuum processing chamber 110. The recesses 110a allow the supports 420 to be inserted into the interior wall of the vacuum processing chamber 110, and the rotational axes 410 penetrate into the interior wall of the vacuum processing chamber 110 so a to be coupled axially with the driving part provided at an exterior of the vacuum processing chamber 110.

It will be apparent to those skilled in the art than various modifications and variations can be made in the apparatus and method for manufacturing liquid crystal display devices, method for using the apparatus, and device produced by the method of the present invention. Thus, it is intended that the present invention covers the modifications and variations of this invention provided they come within the scope of the appended claims and their equivalents.

What is claimed is:

1. A method manufacturing a liquid crystal display device, comprising the steps of:
    introducing first and second substrates into a unitary vacuum processing chamber;
    affixing the first substrate onto a lower stage and the second substrate onto an upper stage within the vacuum processing chamber; and
    contacting supports of a substrate receiving system to only dummy areas between cell areas of the second substrate affixed on the upper stage within the vacuum processing chamber after the second substrate is affixed to the upper stage and the first substrate is affixed to the lower stage, for a vacuum process of the unitary vacuum processing chamber,
    wherein the step of contacting supports of a substrate receiving system to only dummy areas includes a step of extending the supports of the substrate receiving system beneath the second substrate so that support protrusions attached to the supports of the substrate receiving system contact the dummy areas.

2. The method according to claim 1, wherein the step of introducing first and second substrates includes first and second arms.

3. The method according to claim 1, wherein the step of affixing the first and second substrates includes providing a vacuum force to the upper and lower stages.

4. The method according to claim 1, wherein the step of affixing the first and second substrates includes providing an electrostatic force to the upper and lower stages.

* * * * *